US010331591B2

(12) United States Patent
Etsion et al.

(10) Patent No.: US 10,331,591 B2
(45) Date of Patent: Jun. 25, 2019

(54) LOGICAL-TO-PHYSICAL BLOCK MAPPING INSIDE THE DISK CONTROLLER: ACCESSING DATA OBJECTS WITHOUT OPERATING SYSTEM INTERVENTION

(71) Applicant: Technion Research and Development Foundation Ltd., Haifa (IL)

(72) Inventors: Yoav Etsion, Atlit (IL); Yonatan Gottesman, Pardesia (IL); Lluis Vilanova, Barcelona (ES)

(73) Assignee: TECHNION RESEARCH AND DEVELOPMENT FOUNDATION LTD., Haifa (IL)

( * ) Notice: Subject to any disclaimer, the term of this patent is extended or adjusted under 35 U.S.C. 154(b) by 688 days.

(21) Appl. No.: 14/846,778

(22) Filed: Sep. 6, 2015

(65) Prior Publication Data

US 2016/0098367 A1 Apr. 7, 2016

Related U.S. Application Data

(60) Provisional application No. 62/060,716, filed on Oct. 7, 2014.

(30) Foreign Application Priority Data

Sep. 7, 2014 (GB) .................................... 1415796

(51) Int. Cl.
| | |
|---|---|
| G06F 3/06 | (2006.01) |
| G06F 13/32 | (2006.01) |
| G06F 12/109 | (2016.01) |
| G06F 9/455 | (2018.01) |
| G06F 12/1036 | (2016.01) |
| G06F 12/1027 | (2016.01) |

(52) U.S. Cl.
CPC ............ *G06F 13/32* (2013.01); *G06F 3/0619* (2013.01); *G06F 3/0665* (2013.01); *G06F 3/0689* (2013.01); *G06F 9/45558* (2013.01); *G06F 12/109* (2013.01); *G06F 12/1027* (2013.01); *G06F 12/1036* (2013.01); *G06F 2009/45579* (2013.01); *G06F 2212/657* (2013.01)

(58) Field of Classification Search
None
See application file for complete search history.

(56) References Cited

U.S. PATENT DOCUMENTS

| 4,403,288 A | 9/1983 | Christian et al. |
| 6,453,392 B1 | 9/2002 | Flynn, Jr. |

(Continued)

OTHER PUBLICATIONS

Single Root I/O Virtualization and Sharing Specification, Revision 1.1, 90 pages, Jan. 20, 2010.

(Continued)

*Primary Examiner* — Scott C Sun
(74) *Attorney, Agent, or Firm* — Kligler & Associates (57) ABSTRACT

Data access in a storage device managed by a storage controller is carried out by receiving in the storage controller offsets in objects directly from a plurality of requesting entities of a computer system. The computer controls a mapping mechanism operated by the storage controller, wherein the mapping mechanism relates the offsets in the objects into physical addresses of the data on the storage device, and wherein the data is accessed at the physical addresses.

18 Claims, 10 Drawing Sheets

(56) References Cited

U.S. PATENT DOCUMENTS

| | | |
|---|---|---|
| 7,467,381 B2 | 12/2008 | Madukkarumukumana et al. |
| 2011/0023027 A1* | 1/2011 | Kegel .................... G06F 12/10 718/1 |
| 2011/0239213 A1 | 9/2011 | Aswani et al. |
| 2012/0096217 A1 | 4/2012 | Son et al. |
| 2013/0254477 A1 | 9/2013 | Swanson et al. |
| 2014/0075436 A1 | 3/2014 | Kagan et al. |

OTHER PUBLICATIONS

Caulfield et al., "Providing safe, user space access to fast, solid state disks", Proceedings of the 17th International Conference on Architectural Support for Programming Languages and Operating Systems pp. 387-400, year 2012.

Caulfield et al., "Moneta: A High-performance Storage Array Architecture for Next-generation, Non-volatile Memories", Proceedings of the 43rd Annual IEEE/ACM International Symposium on Microarchitecture, pp. 385-395, year 2010.

Silberstrin et al.,"GPUfs: integrating a file system with GPUs", Proceedings of the 18th International conference on architectural support for programming languages and operating systems,pp. 485-498, year 2013.

PCI Express® Base Specification, Revision 3.1, 1073 pages, Mar. 14, 2014.

* cited by examiner

LOGICAL-TO-PHYSICAL BLOCK MAPPING INSIDE THE DISK CONTROLLER: ACCESSING DATA OBJECTS WITHOUT OPERATING SYSTEM INTERVENTION

BACKGROUND OF THE INVENTION

1. Field of the Invention

This invention relates to computers and digital processing systems. More particularly, this invention relates to storage system management and control.

2. Description of the Related Art

The meanings of certain acronyms and abbreviations used herein are given in Table 1.

TABLE 1

Acronyms and Abbreviations

| | |
|---|---|
| CPU | Central Processing Unit |
| DMA | Direct Memory Access |
| GPU | Graphics Processing Unit |
| I/O | Input/Output |
| ID | Identifier |
| LBA | Logical Block Address |
| NIC | Network Interface Card |
| OS | Operating System |
| PCI | Peripheral Component Interconnect |
| PCIe | Peripheral Component Interconnect Express |
| PF | Physical Function |
| PLBA | Physical Logical Block Address |
| SR-IOV | Single Root I/O Virtualization |
| TLB | Translation Lookaside Buffer |
| VF | Virtual Function |
| VLBA | Virtual Logical Block Address |
| VM | Virtual Machine |

Emerging high-performance data processing systems make use of multiple processors, accelerators and various physical devices and compartmentalize applications inside virtual machines. These rich environments are composed of many physical and virtual entities that need fast access to disk storage. However, the increasing complexity and versatility of these systems require that they provide strict data security and isolation mechanisms that can protect data from being accessed by an unauthorized entity.

Traditionally, security and performance have been considered opposing trends; providing data security typically incurs performance overheads (and vice versa). For example, existing systems provide security guarantees by requiring that only a single trusted entity, namely the operating system, can access data stored on disks. The operating system enforces security policies and acts as a proxy for all other system entities. As a result, all data accesses incur a substantial overhead when marshaling requests to the disk controllers through the operating system. However, the prevalent single-trusted-entity only emphasizes the data access overheads for virtual machines and physical accelerators (as well as other devices in the system), for orthogonal reasons. On one hand, virtual machines employ an internal operating system to provide data protection for their internally executing applications, thus replicating the data access overhead. On the other hand, physical accelerators and other devices can directly access the peripheral device interconnect and disk controllers attached to it. However, since data protection and isolation are provided by the operating system, they must communicate with the disk controllers by forwarding all their data requests through the central processing unit (CPU), which runs the operating system.

Generally, accelerators and other devices in a system rely on the CPU cooperatively with the operating system to arbitrate data access requests involving storage units. Indeed, the CPU itself may formulate and transmit such requests. In the case of a virtual environment, storage I/O is usually managed by the hypervisor, which must multiplex outgoing I/O requests from several virtual machines to a single storage device. There are several methods of I/O virtualization:

Emulation: The hypervisor traps I/O requests from the virtual machine (VM) and emulates the behavior of a storage device with a file in its file system.

Paravirtualization: The VM is aware that it is running on a virtual machine and its drivers communicate with the underlying hypervisor directly, which also emulates the storage.

Direct I/O: The hypervisor gains access to the address space of the device on behalf of the VM, and the VM then communicates directly with the device without the hypervisor's intervention.

In emulation and paravirtualization security and isolation are achieved by the hypervisor. Every storage device is emulated by a file on its file system, and when a VM requests to access its storage device, the hypervisor routes the request to the correct offset in that file. In these methods, there is a performance overhead because every request must be taken care of by the hypervisor. If the storage device is shared by another accelerator in the system, for example in a graphics processing unit (GPU) or another device, every request from the accelerator must also go through the host OS and the hypervisor, which prevents the host CPU from being idle. In this case, there is an impact on the power consumption of the host CPU.

In the case of direct I/O, security is enforced at the storage device level because only one VM can control the storage device. This method has almost no performance overhead, but has the drawback of not being able to share the device among several VM's.

SUMMARY OF THE INVENTION

In modern systems, a device that wishes to access the disk must usually delegate the request to the operating system, which runs on the main CPU, which in turn activates the disk. Moreover, in many cases, the data has to be copied from the disk to the CPU memory and only then to the external device. Disk controllers have no notion of access permissions, so any entity (device, virtual machine, user process) that is physically allowed to access the disk may access other entity's data.

In the case of systems that support a virtual environment the list of devices that need to access the disk includes virtual machines. However, as noted above, existing systems require that file accesses be delegated to the operating system or hypervisor. This burdens the system's performance and power consumption.

Embodiments of the invention enable hardware and software entities in the computer to securely and directly access stored objects, e.g., files, with low latency. A mapping mechanism for a storage controller, e.g., a disk controller translates offsets in an object to a physical address. Other components function cooperatively with the mapping mechanism to enforce the access permissions in order to prevent unauthorized entities from accessing data on the disk. The mapping mechanism does not dictate whether the mapping tables should be stored on the disk controller or in main memory. Moreover, embodiments of the mapping mechanism enable the disk controller to facilitate mapping by creating shadow controllers that map individual files. The mapping mechanism enables low-latency and high bandwidth access to on-disk data by removing the CPU and the management software system (operating system/hypervisor) from the critical path of disk data transfers. Instead of passing all disk-read requests through the CPU, devices and virtual machines are able to access on-disk data directly.

There is provided according to embodiments of the invention a method of computing, which is carried out by receiving in a storage controller offsets in objects from a plurality of requesting entities of a computer system for data that is stored on a storage device managed by the storage controller. The computer controls a mapping mechanism operated by or in conjunction with the storage controller, wherein the mapping mechanism relates the offsets in the objects into physical addresses of the data on the storage device, and wherein the data is accessed at the physical addresses, e.g., files.

According to one aspect of the method, the offsets in the objects comprise virtual addresses of the data.

According to another aspect of the method, the offsets in the objects are communicated between the requesting entities and the storage controller while avoiding use of the operating system.

According to still another aspect of the method, the computer system includes physical devices and the requesting entities include the physical devices.

According to an additional aspect of the method, the requesting entities comprise executing programs of the computer system.

According to another aspect of the method, the mapping mechanism includes tables stored in a memory for exclusive use by respective requesting entities.

There is further provided according to embodiments of the invention a method of computing in a virtualized environment, which is carried out by receiving in a disk controller disk access requests from a plurality of virtual machines as virtual addresses of data that are stored on a disk, wherein the mapping mechanism translates the virtual addresses into physical addresses of the data on the disk, and wherein the data is accessed at the physical addresses.

Another aspect of the method is carried out prior to receiving the disk access requests by using a hypervisor to install and configure mapping tables, the mapping tables relating the virtual addresses to the physical addresses, wherein translating is performed using the mapping tables.

According to another aspect of the method, the virtual machines have respective guest operating systems, and a routing of the disk access requests of the virtual machines avoids the hypervisor.

According to a further aspect of the method, the mapping tables are installed in a memory of the disk controller.

According to yet another aspect of the method, the mapping tables are installed in a host memory.

According to still another aspect of the method, the mapping tables comprise block tables for exclusive use of respective virtual machines.

According to an additional aspect of the method, the block tables are multilevel tables.

According to another aspect of the method, the block tables have exactly two levels.

According to a further aspect of the method, the mapping tables are hash tables.

One aspect of the method includes using the hypervisor to establish a physical function for managing the disk controller.

Still another aspect of the method includes using the hypervisor to establish respective virtual functions for the virtual machines, and accessing the data for the virtual machines includes invoking the respective virtual functions thereof.

According to an additional aspect of the method, accessing the data includes using the disk controller to execute a direct memory access and to generate an interrupt, handling the interrupt in the hypervisor by issuing a virtual interrupt, and handling the virtual interrupt in one of the virtual machines.

There is further provided according to embodiments of the invention a data processing system, including a disk storage unit that stores data, a processor, and a host memory accessible to the processor storing programs and data objects therein. The programs and data objects include a plurality of virtual machines, wherein execution of the programs cause the processor to issue disk access requests from the virtual machines for reading or writing the data on the disk storage unit at respective virtual addresses. The system includes a disk controller linked to the processor, wherein the disk controller is operative for receiving the disk access requests, translating the virtual addresses thereof into physical addresses on the disk storage unit and accessing the data at the physical addresses.

According to a further aspect of the system, the programs and data objects comprise a hypervisor that manages the virtual machines, wherein an invocation of the hypervisor by the processor causes the hypervisor, prior to receiving the disk access requests, to install and configure mapping tables for exclusive use by respective virtual machines, the mapping tables relating the virtual addresses to the physical addresses, wherein translating the virtual addresses to the physical addresses by the mapping mechanism is performed using the mapping tables.

According to one aspect of the system, the programs and data objects further comprise an operating system, wherein a routing of the disk access requests of the virtual machines avoids the operating system and the hypervisor.

According to one aspect of the system, the hypervisor is operative to establish a physical function in the disk controller for accessing the mapping tables and to establish virtual functions for respective virtual machines, wherein accessing the data includes invoking the virtual functions.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Overview.

Figure 1:
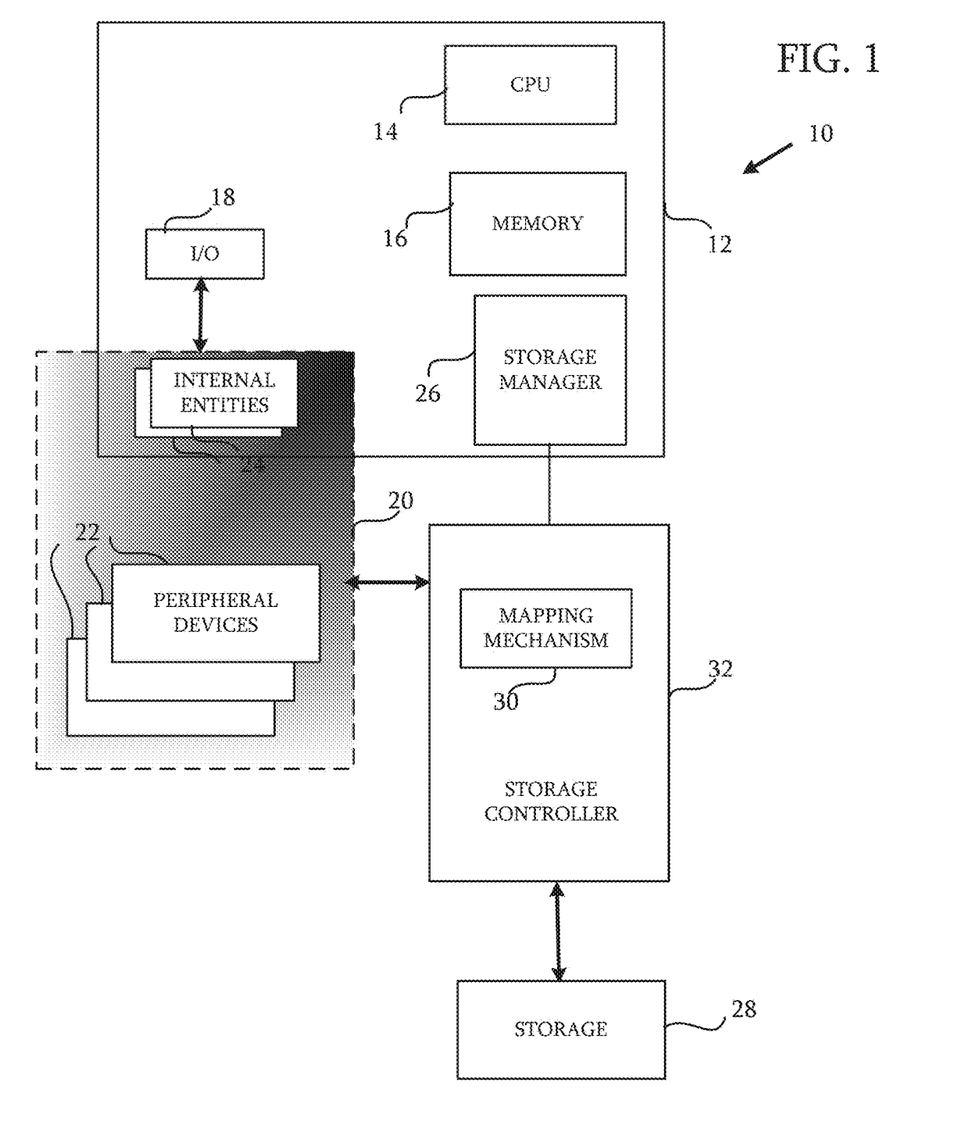
FIG. 1 is a high-level block diagram of a system in accordance with an embodiment of the invention.

Turning now to the drawings, reference is initially made to FIG. 1, which is a high level block diagram of a system 10 to which the principles of the invention may be applied. The system 10 typically comprises a general purpose or embedded computer processor 12, which is programmed with suitable software for carrying out the functions described hereinbelow. Thus, although portions of the systems shown in this figure and other drawing figures herein are shown as comprising a number of separate functional blocks, these blocks are not necessarily separate physical entities, but rather may represent, for example, different computing tasks or data objects stored in a memory that is accessible to the processor. These tasks may be carried out in software running on a single processor, or on multiple processors. The software may be provided to the processor or processors on tangible non-transitory media, such as CD-ROM or non-volatile memory. Alternatively or additionally, the system 10 may comprise a digital signal processor or hard-wired logic.

The processor 12 typically comprises a CPU 14 that can access a memory 16 that stores various programs and data objects, including an operating system. The processor 12 has an I/O interface 18. A group of devices 20, e.g., accelerators and network cards, communicate with elements of the processor 12. The devices 20 may include entities 22 external to the processor 12, e.g., accelerator cards, network cards. The devices 20 may include entities 24 that are internal to the processor 12, e.g., virtual machines. In any case, there is a storage manager 26 that facilitates access to a storage 28 by the devices 20 in a manner described in further detail hereinbelow. Translation between logical addresses of data requested by the devices 20 and physical addresses of the storage 28 is effected by a mapping mechanism 30 within a controller 32. The controller 32 is typically but not necessarily integral with the storage 28. The processor 12 is intentionally simplified for clarity of presentation. It will be understood that the processor 12 may have many different architectures and configurations, and is not limited to the specific version shown in FIG. 1.

The storage 28 may be, for example, a local disk, or any type of peripheral storage device. While a single storage 28 is shown, the controller 32 may be responsible for multiple storage entities, which need not be identical.

Instantiation and configuration of the mapping mechanism 30 are performed for the devices 20 by the storage manager 26 prior to any access. The mapping mechanism 30 includes translation tables, and permissions. The mapping mechanism 30 enforces security measures to prevent members of the devices 20 from accessing prohibited data on the storage 28.

Once the mapping mechanism 30 has been configured, the devices 20 may interact directly with the controller 32 to access data, without recourse to the facilities of the operating system of the processor 12 or the storage manager 26.

First Embodiment

Figure 2:
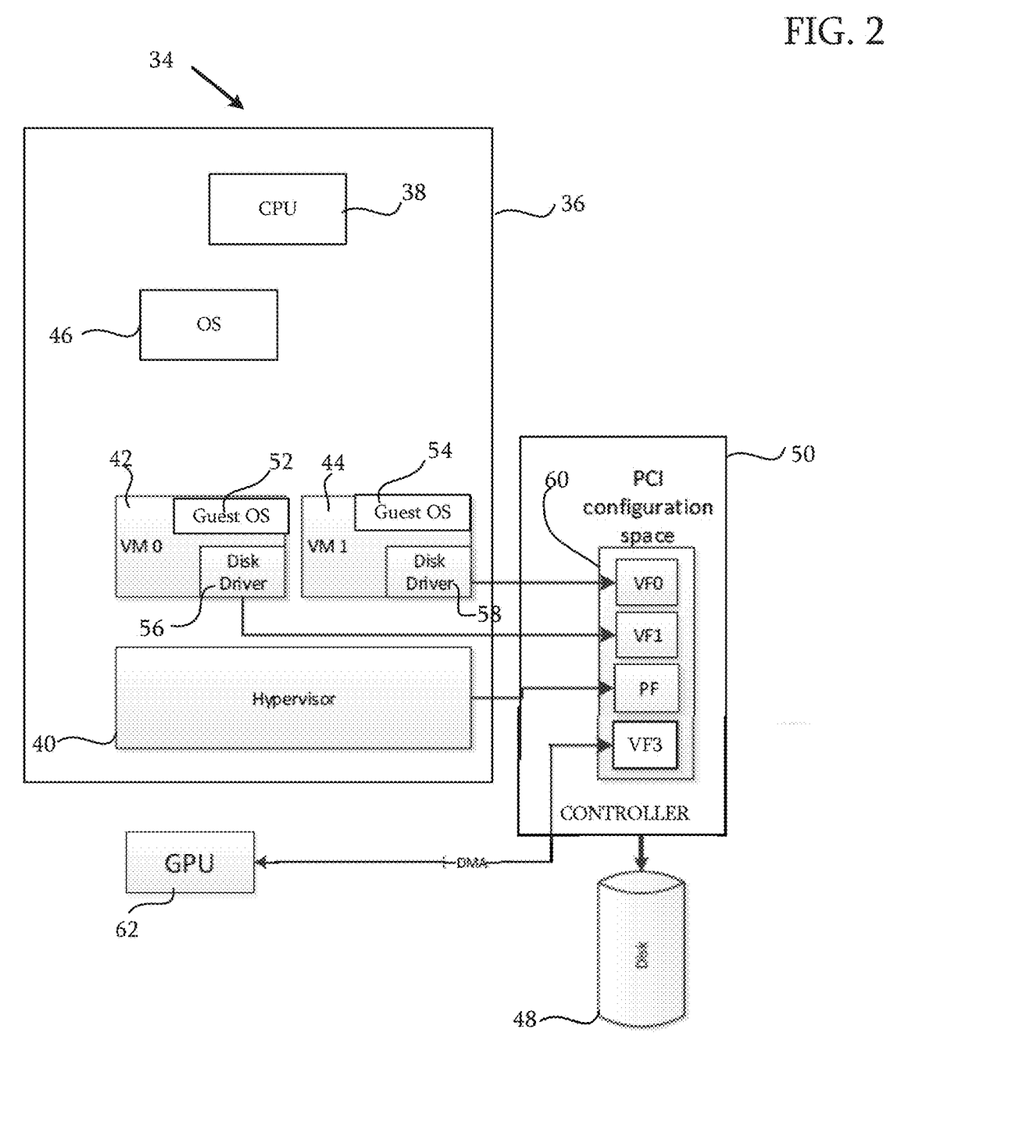
FIG. 2 is a schematic block diagram of an exemplary system that supports a virtualized environment in accordance with an embodiment of the invention.

Reference is now made to FIG. 2, which is a schematic block diagram of an exemplary system 34 to which the principles of the invention apply. The system 34 is a specialization of the system 10 (FIG. 1) adapted to a virtual environment The configuration of the system 34 is simplified for clarity of presentation, and the principles of the invention may similarly be applied, mutatis mutandis, to many other system configurations supporting a virtual environment, e.g., any number of disks and disk controllers, network topologies, hypervisors, accelerators such as graphics processing units (Gals) and virtual machines. Such systems may employ various methods of I/O virtualization.

The system 34 comprises a computing device 36 having a central processing unit 38 (CPU). The computing device 36 includes a hypervisor 40 that manages virtual machines 42, 44 and deals with a system operating system 46 (OS). I/O requests from the virtual machines 42, 44 are addressed to a data store, represented in FIG. 2 by a disk 48 and a disk controller 50. The disk 48 and disk controller 50 are exemplary, and other types of storage devices and storage controllers may be present in other configurations of the system 34. The virtual machines 42, 44 may use the facilities of the operating system 46 or may employ guest operating systems 52, 54, which need not be the same operating systems. The virtual machines 42, 44 may have separate disk drivers 56, 58. A virtual file system 60, indicated in FIG. 2 as a PCI configuration space, and described in further detail below, implements the mapping mechanism 30 (FIG. 1). The virtual file system 60 is typically, but not necessarily, physically incorporated into the disk controller 50.

A graphics processing unit 62 (GPU) accesses data via the disk controller 50 and disk 48, typically by direct memory access (DMA). The graphics processing unit 62 cannot directly access the disk 48, but submits requests and exchanges data via the disk controller 50, using one of the virtual files in the virtual file system 60. Thereafter, the data may be accessed using conventional DMA techniques. The hypervisor 40 and the central processing unit 38 are uninvolved with GPU requests. Indeed, as explained below, disk access requests by the virtual machines 42, 44 avoid the hypervisor 40 and, moreover, are not mediated by the operating system 46. Rather, the disk controller 50 reads data from the disk and write to pages or disk addresses specified by access requests issued by the virtual machines 42, 44 or by the graphics processing unit 62.

Figure 3:
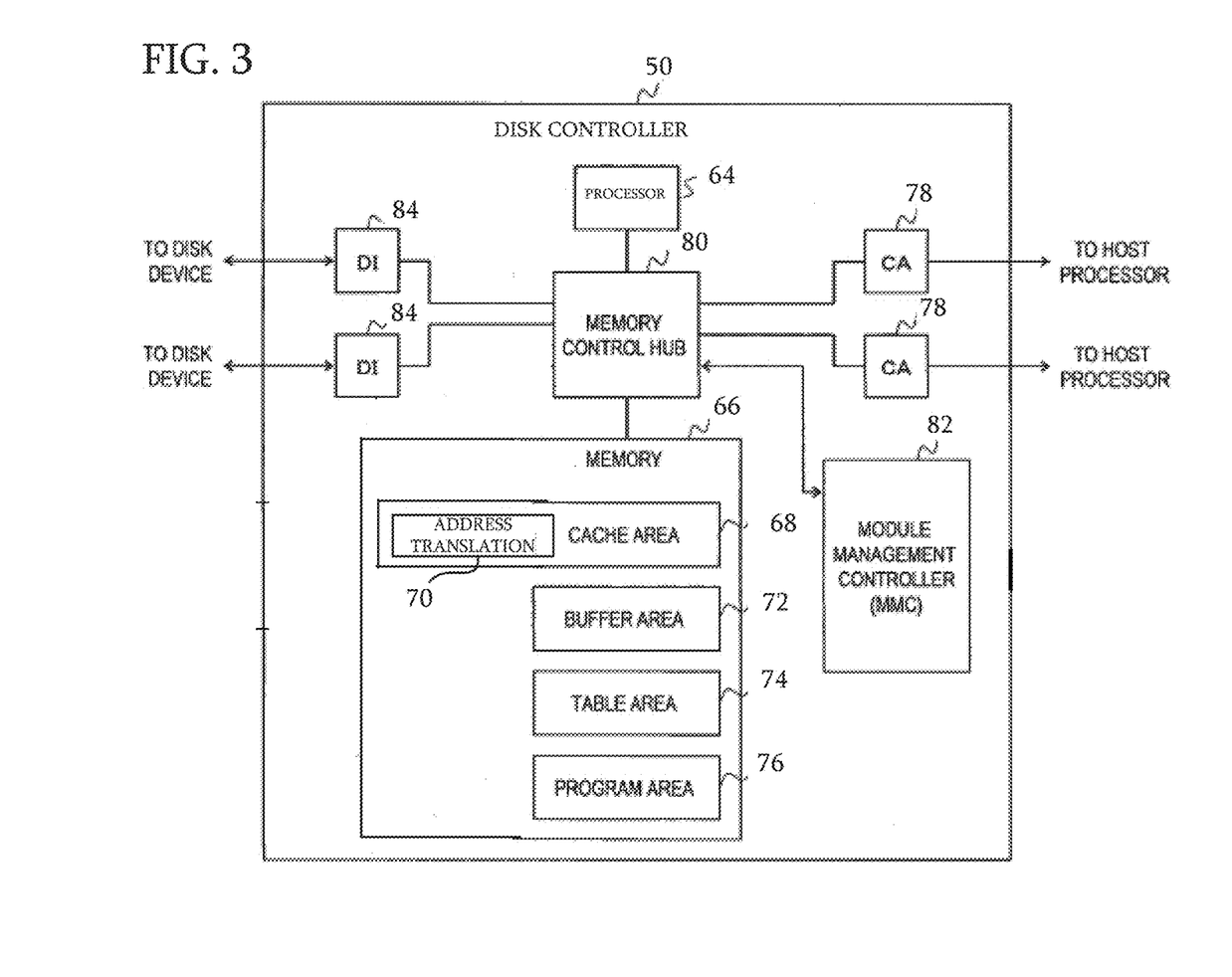
FIG. 3 is a detailed block diagram of a disk controller in accordance with an embodiment of the invention.

Reference is now made to FIG. 3, which is a detailed block diagram of a typical embodiment of the disk controller 50 (FIG. 2). The disk controller 50 has a processor 64 and a memory 66, portions of which may be designated for a cache 68, typically used as a disk cache. Typically, the cache 68 includes an address translation cache 70, which functions much like a translation lookaside buffer (TLB), maintaining VLBA (Virtual Logical Block Address) to PLBA (Physical Logical Block Address) translations and thereby expediting address translations. The memory 66 has provisions for a buffer area 72 that temporarily holds data to be transferred, a table area 74 for storing control data, and a program area 76, which holds control programs that are executed by the processor 64. Typically, exchanges from host processors to access disks are received via channel adapters 78 comprising host interfaces. The requests and retrieved data are coordinated in a memory control hub 80 linked to a memory management controller 82, which deals with routing the exchanges and their status. Device interfaces 84 connect to disk devices. While two channel adapters 78 and two device interfaces 84 are shown, any number of these elements may be present.

Figure 4:
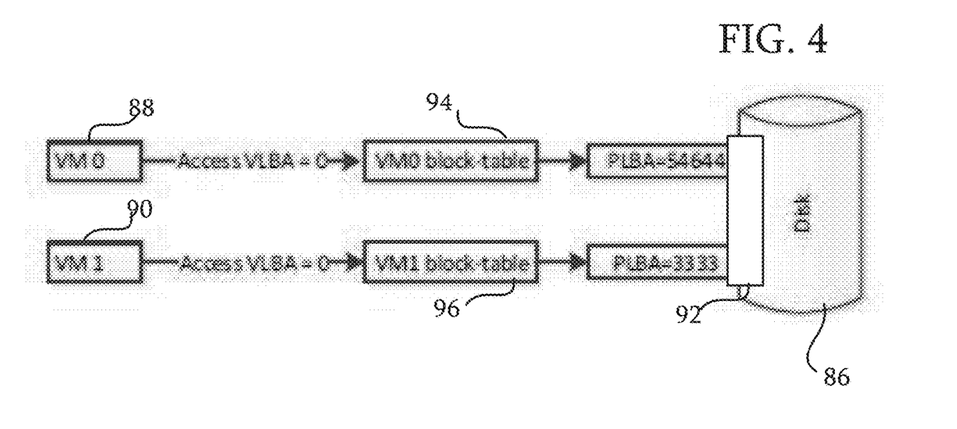
FIG. 4 is a block diagram illustrating block mapping for a disk in a virtualized environment in accordance with an embodiment of the invention.

Reference is now made to FIG. 4, which is a block diagram illustrating block mapping for a disk 86 in a virtualized environment comprising virtual machines 88, 90, in accordance with an embodiment of the invention. The smallest granularity a client can access on the disk is a block, and each block on the disk has a linear address, i.e., a logical block address (LBA). When a client needs to access a storage block on the disk 86, it requests the LBA of that block. From the point of view of the disk controller 50 (FIG. 3), an LBA requested by a client is just a virtual LBA (VLBA). A VLBA represents the virtual address of a block in all the storage blocks allocated to a specific client. Just as a memory management unit is required to translate a virtual address to a physical one, the disk controller 50 translates the VLBA to a physical logical block address (PLBA). The PLBA is a real address of a block of storage on the disk 86. The underlying structure of file storage in the disk is generally hidden from the virtual machines 88, 90, and in general does not correspond to the VLBA. The translation between a client's VLBA's to PLBA's is done by the disk controller 50 using block tables. The block tables may reside in host memory or in the table area 74 of the memory 66 (FIG. 3).

Block tables for each of the virtual machine are created by the hypervisor 40 (FIG. 2) before access requests can be recognized by the disk controller 50. The hypervisor 40 informs the disk controller 50 of the memory address of the block tables for each of the virtual machines 88, 90. Isolation is enforced by the existence of respective block tables for clients. The block tables that translate VLBA requests from each client to PLBA's are allocated exclusively to that client.

In the example of FIG. 4, virtual machines 88, 90 (VM0, VM1) access their respective storage at VLBA 0. The disk driver of virtual machine 88 requests access to VLBA from disk controller 92 of disk 86. The hypervisor 40 has previously configured the block tables in order to map a virtual file to the memory space of each virtual machine The memory management controller 82 (FIG. 3) utilizes the block tables to prevent a virtual machine from accessing a virtual file other than the one designated for that virtual machine.

Of course, when it is necessary to map a large storage, the number of levels in block table 96 may be expanded optimally. Moreover, other known mapping schemes may be substituted for the block tables of FIG. 5, for example hash tables and tree structures. In any case, each virtual file has its own table or system of tables that the storage controller uses to translate addresses.

The disk controller 92 obtains the base address of block table 94 of virtual machine 88 from host memory or its own memory and uses it to translate VLBA 0 to PLBA 54644. The real data on the disk is at PLBA 54644, which is then accessed by the disk controller to satisfy the request.

In like manner, when virtual machine 90 accesses VLBA 0 it is translated by the disk controller to PLBA 3333 using block table 96 of virtual machine 90.

Figure 5:
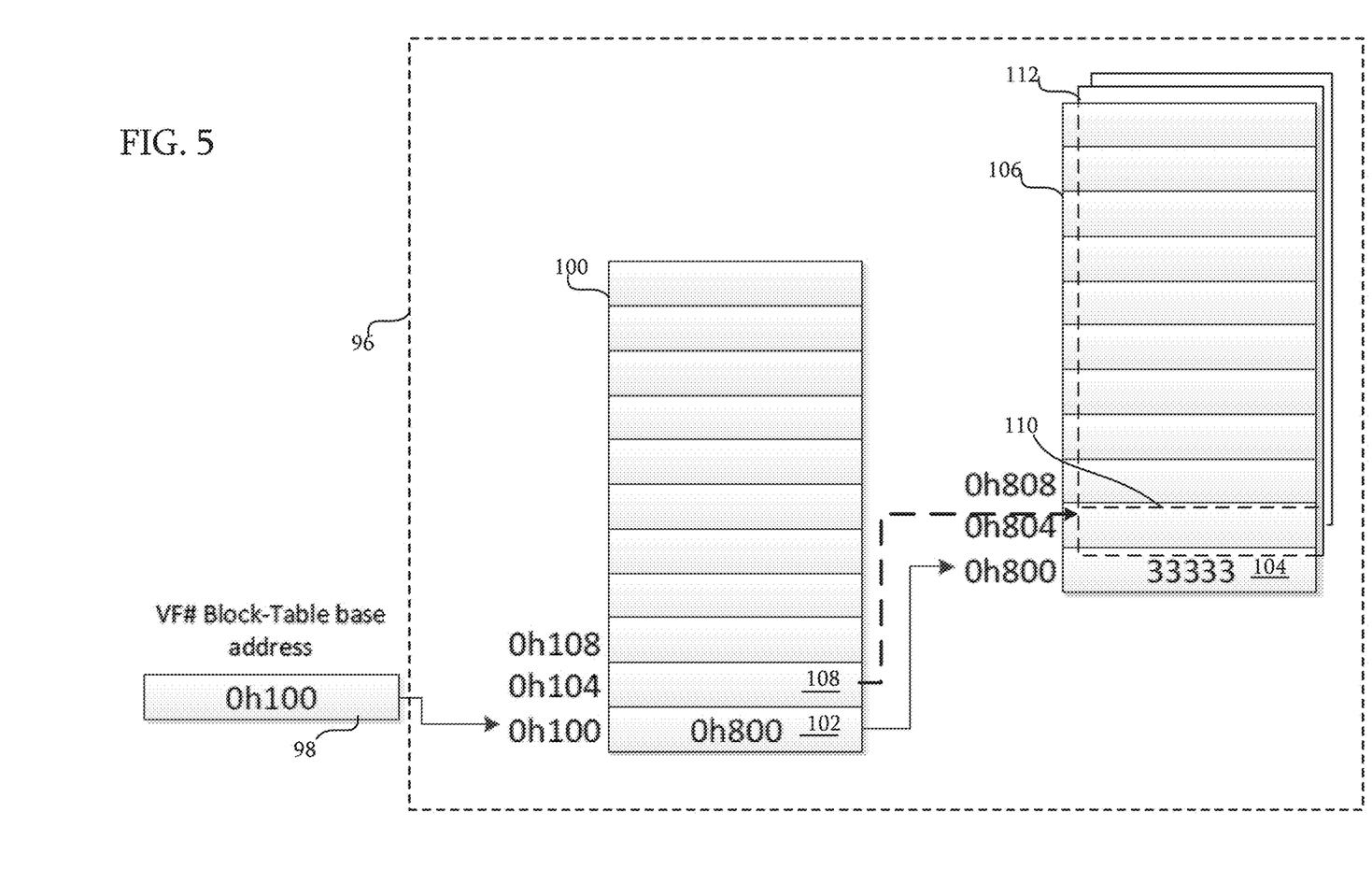
FIG. 5 is a detailed illustration of the structure of a block table in accordance with an embodiment of the invention.

Reference is now made to FIG. 5, which is a detailed illustration of the structure of the block table 96 (FIG. 4), in accordance with an embodiment of the invention. Block table 96 is a multi-level structure, which is pointed to by a base register 98, holding the base addresses of virtual files. While the principles of the invention are often explained in terms of access to files, these principles are applicable to many types of files including interleaved files, and to other objects. In this example, the base register 98 holds the address 0h100. The value 0h100 is the base address for first level table 100. Entries in first level table 100 hold an address to the base of a respective second level table. For example, first entry 102 in first level table 100 (0h800) points to base entry 104 in second level table 106. The value 0h800 constitutes points to an array of entries that populate second level table 106, VLBA0 through VLBA-n. A second entry 108 in first level table 100 would point to a base entry 110 in second level table 112, and so forth.

Each entry in the second level tables 106, 112 is a PLBA. In this example VLBA=0 maps to PLBA=33333. The entries of each of the second level tables in FIG. 5 constitute collections of PLBA's. While not explicitly shown in FIG. 5 for clarity of presentation, it will be understood that the virtual address space is contiguous; and that the physical space referenced by successive PLBA's is generally not contiguous.

Hardware Implementation.

Access requests for data on the disk are issued by the virtual machines to the disk controller, bypassing the hypervisor. One way of sharing the use of the disk controller 50 (FIG. 2) among several VM's and accelerators in a secure manner is an implementation of the well-known PCI-SIG SR-IOV interface. The SR-IOV specification allows a PCI Express (PCIe) I/O device to appear as multiple physical and virtual devices, using the concept of physical and virtual functions:

Physical function (PF)—There is at least one PF for each physical port on a hardware adapter. In some cases, adapters can be partitioned into several ports for each physical port. Essentially, PFs have full configuration capabilities. They are associated with the hypervisor and can be managed like physical devices.

Virtual function (VF)—VFs are associated with VMs and are limited to processing I/O streams, basically moving data. They do not support management of the physical device. As noted above, each virtual function is a virtual storage device, i.e., a collection of PLBA's that are represented through a VLBA-PLBA mapping table hierarchy.

Figure 6:
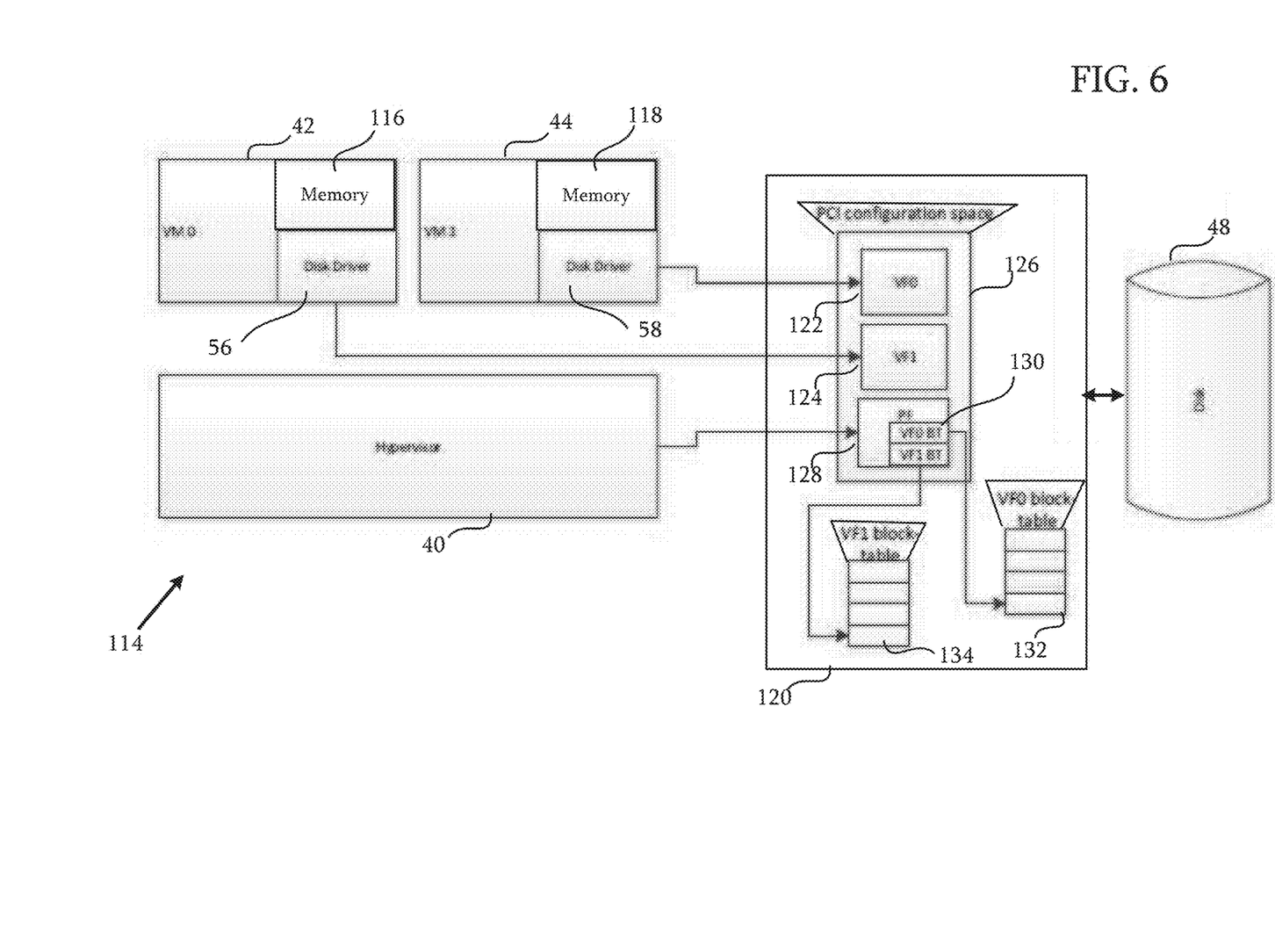
FIG. 6 is a detailed block diagram of a system in accordance with an embodiment of the invention.

Reference is now made to FIG. 6, which is a detailed block diagram of a system 114 in accordance with an embodiment of the invention. In the system 114 virtual machines 42, 44 have memories 116, 118, which exchange information with the disk 48, as explained below. The memories 116, 118 are shown as discrete entities in FIG. 6. However, in many embodiments they are realized as allocations of a common system memory, e.g., the memory 16 (FIG. 1).

A disk controller 120 for a single storage device, represented in FIG. 6 as the disk 48, appears as several virtual functions 122, 124 (VF0, VF1)) in a PCI configuration space 126. Each of the virtual functions 122, 124 can be directly assigned to a different VM, giving that VM control over the disk 48, in this example the virtual functions 122, 124 are respectively assigned to the virtual machines 42, 44.

The PCI configuration space 126 includes one physical function 128 (PF) that can be accessed only by the hypervisor 40 and is used to configure and manage the SR-IOV functionality. The physical function 128 has a set of registers 130 that hold the base addresses of virtual function block-tables 132, 134 for the virtual functions 122, 124, respectively, so when one of the virtual functions 122, 124 is accessed, the disk controller 120 can consult the appropriate block-table in order to translate the VLBA to a PLBA. The PCI configuration space 126 supports partitioning of the disk 48 into multiple volumes or the establishment of virtual disk volumes using known schemes.

Configuring a Virtual Function.

Figure 7:
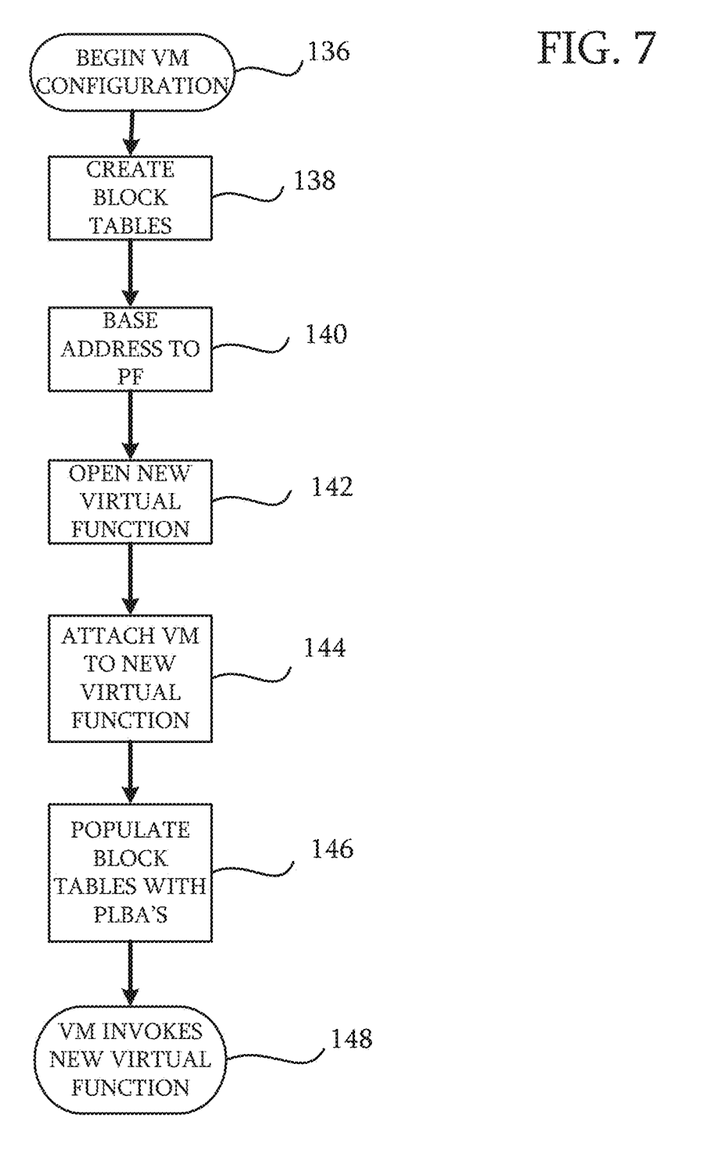
FIG. 7 is a flow-chart of a method for configuring a virtual machine in accordance with an embodiment of the invention.

Reference is now made to FIG. 7, which is a flow-chart of a method for configuring a new virtual machine in accordance with an embodiment of the invention. The process steps are shown in a particular linear sequence in FIG. 7 and other flow-charts herein for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the process.

The method can be understood by reference to the example of FIG. 6. At initial step 136, the hypervisor 40 is required to run a new virtual machine (not shown in FIG. 6) and attach it to the disk 48 via a new virtual function. At step 138, the hypervisor 40 first creates the block-tables that are needed for the new virtual function. These tables are similar to page tables and as noted above, may reside in host memory or in a memory within the disk controller 120.

Next, at step 140 The base address of the block table is passed to the physical function 128 along with the other standard parameters passed to open a new virtual function. Then, at step 142, the disk controller 120 opens a new virtual function in the PCI configuration space 126. Any necessary configuration of the memory management controller 82 (FIG. 2) may be performed by the hypervisor 40 in step 140.

Next, at step 144 the hypervisor 40 can start a new virtual machine, attaching it to the new virtual function.

Next, at step 146 filling the new block tables with PLBA's is performed by the hypervisor 40, which is able manage a list of all free physical blocks on the disk 48.

At final step 148 the disk controller 120 accepts a request from the new virtual machine and executes the new virtual function, using the block tables prepared in steps 138, 140 to obtain the required mappings.

Communication with the Disk Controller.

Figure 8:
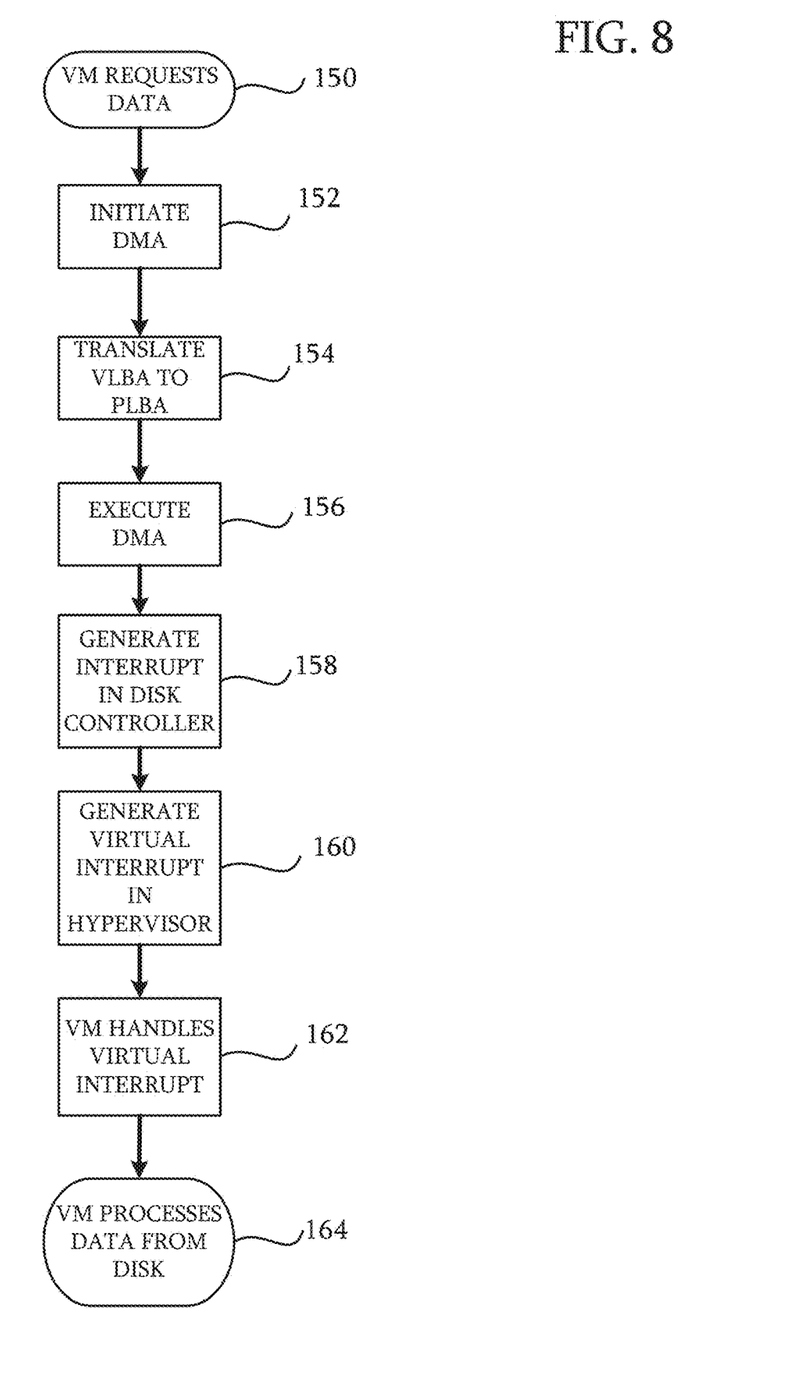
FIG. 8 is a flow-chart of a method for transferring data from a storage device to a virtual machine in accordance with an embodiment of the invention.

Reference is now made to FIG. 8, which is a flow-chart of a method for transferring data from a storage device to a virtual machine, in accordance with an embodiment of the invention. The following method is a detail of one embodiment of final step 148 (FIG. 7).

At initial step 150, a request to move data to a memory in one of the virtual machines 42, 44 is recognized by the disk controller 120. Next, at step 152, the disk controller 120 initiates a DMA action. The DMA is mediated by a memory management unit specialized for I/O, e.g., the memory management controller 82 (FIG. 3). As noted above, the memory management controller 82, will have been configured by the hypervisor 40 in step 140 FIG. 7.

At step 154, the disk controller 120, cooperatively with the memory management controller 82 (FIG. 3) performs the required address translations for the DMA operation. The DMA occurs at step 156

When the DMA operation is finished, at step 158 the disk controller 120 posts an interrupt indicating the DMA operation has completed. This interrupt may be received by the hypervisor 40, which reacts by injecting a virtual interrupt at step 160 to the appropriate virtual machine, indicating to the virtual machine that the operation has completed. Alternatively, the interrupt may be received and handled directly by the appropriate virtual machine, bypassing the hypervisor 40

Next, at step 162 the interrupt handler of the appropriate virtual machine responds to the virtual interrupt. At final step 164 one of the disk drivers 56, 58 (FIG. 2) continues processing its request, e.g., notifying an upper level of its guest operating system that the data has arrived.

Data Security.

It will be evident from the foregoing discussion that the function of the block-tables 132, 134 (FIG. 6) and their management by the hypervisor 40 enforce a separation of the data protection mechanism from the data protection policy. Referring again to FIG. 2, the separation is achieved by the disk controller 50 cooperatively with the hypervisor 40 and offloads mapping of files to disk blocks from the central processing unit 38 to the disk controller 50 with a consequent improvement in performance.

Second Embodiment

Figure 9:
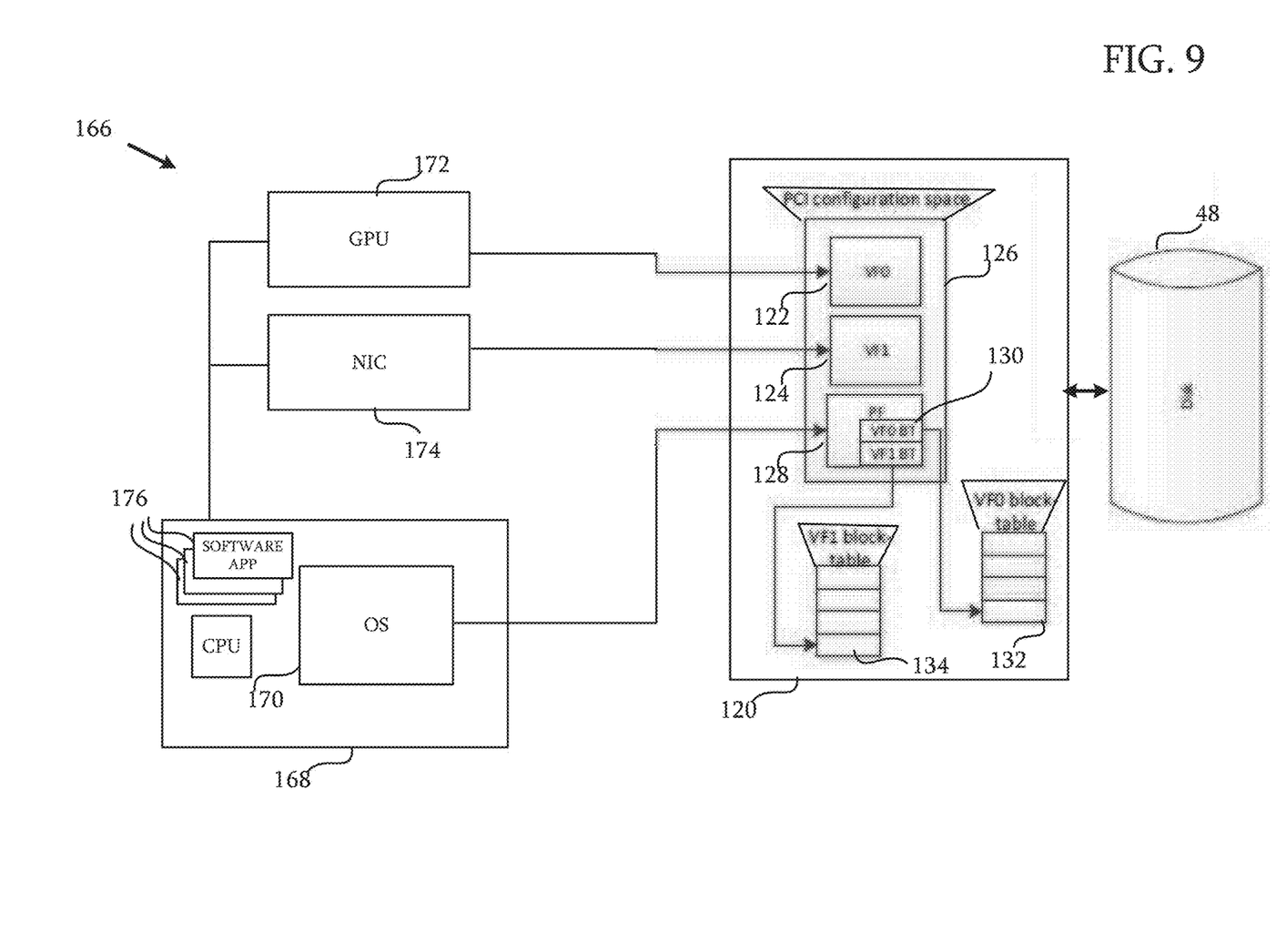
FIG. 9 is a schematic block diagram of a system in accordance with an alternate embodiment of the invention.

Reference is now made to FIG. 9, which is a detailed block diagram of a system 166 in accordance with an alternate embodiment of the invention. In this embodiment, the principles of the invention are illustrated in an environment that does not necessarily involve virtualization. However, elements of the system 114 (FIG. 6) may be incorporated and participate in the system 166 in many combinations.

The entities requiring access to the disk 48 include physical entities that serve a processor 168 running under an operating system 170. Any number of such physical entities may be present. In the example of FIG. 9 there are a GPU 172 and a network interface card 174 (NIC). Entities requiring access to the disk 48 may also include software clients 176 other than virtual machines. Direct access by the physical entities and software applications to the disk 48 is enabled by a manager, which can be the operating system 170.

Figure 10:
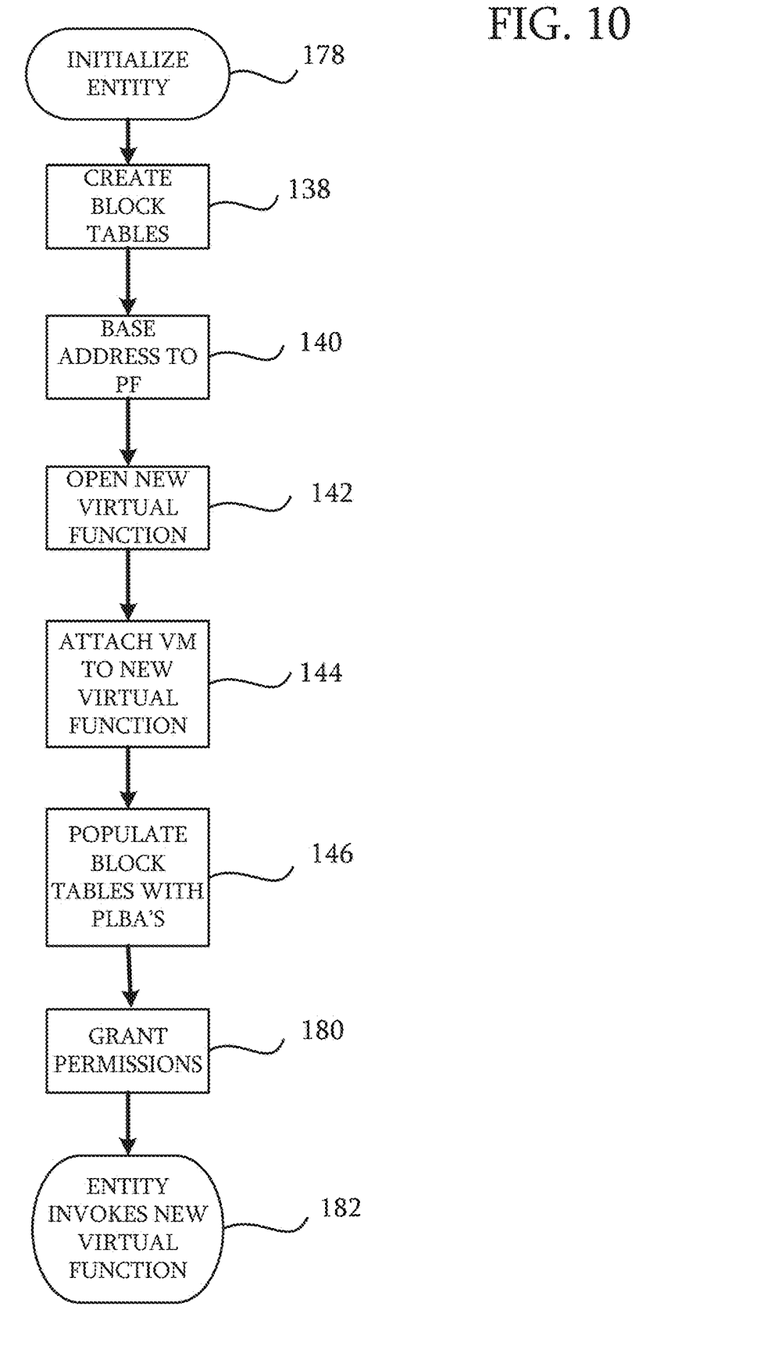
FIG. 10 is a flow-chart of a method for configuring an entity to access a disk in accordance with an embodiment of the invention.

Reference is now made to FIG. 10, which is a flow-chart of a method for configuring an entity to access a disk in accordance with an embodiment of the invention. The method has steps that are identical to the steps in the method shown in FIG. 7. These are not repeated in the interest of brevity. As noted above the process steps shown may be performed in different orders than shown or concurrently.

At initial step 178 device, e.g., a physical device or software entity other than a virtual machine is initialized in accordance with its requirements. Initial step 178 may include establishment of communication with the processor. The following sequence of steps is typically performed by the operating system of the processor, but can be performed by another program:

After performing steps 138 through step 146, permissions to access the disk controller directly are granted to the entity at step 180. One method associates the mapping tables established in step 138 with a unique device identifier (ID) of the physical device, which serves as its address on a communication medium. It should be noted that the virtual function established in step 142 and step 144 is also assigned a device identifier, as the virtual function is perceived as an actual disk (or other storage device) by the entity. Other permissions techniques known in the art may be used.

Alternatively, a secret tag may be shared between the disk controller and the entity. In any case, step 138 is completed when the device identifier of the virtual function or the secret tag is provided to the physical device.

In final step 182, the entity invokes the new virtual function to access data on the disk. The disk access involves a direct interaction between the physical device and the disk controller, and avoids the operating system (or other manager). The data access may involve a file or portion of the file, another data object, or combinations thereof. The data access may be a DMA or an access involving any mutually agreed upon protocol.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of computing in a data processing system, comprising a computer having a central processing unit that executes a plurality of virtual machines, a hypervisor that manages the virtual machines, an operating system, a storage device, an I/O (input/output) device and a storage controller for the storage device, comprising the steps of:
   originating in the virtual machines access requests to a memory of the storage device;
   routing the access requests from the virtual machines to the storage controller on a path that bypasses the operating system;
   receiving the access requests in the storage controller as virtual addresses;
   with the storage controller translating the virtual addresses into physical addresses of the memory of the storage device;
   accessing the physical addresses;
   routing an I/O access request from the I/O device to the storage controller by bypassing the hypervisor and the central processing unit;
   receiving the I/O access request as an I/O virtual address in a virtual file system in the storage controller;
   obtaining in the storage controller an I/O physical address of the memory of the storage device from the virtual file system; and
   accessing the I/O physical address.

2. The method according to claim 1, further comprising the step of: prior to receiving the access requests using the hypervisor to install and configure mapping tables, the mapping tables relating the virtual addresses to the physical addresses, wherein the step of translating is performed using the mapping tables.

3. The method according to claim 2, wherein a routing of the access requests of the virtual machines avoids the hypervisor.

4. The method according to claim 2, wherein the mapping tables are installed in the memory of the storage controller.

5. The method according to claim 2, wherein the mapping tables are installed in a host memory of the computer.

6. The method according to claim 2, wherein the mapping tables comprise block tables for exclusive use of respective virtual machines.

7. The method according to claim 6, wherein the block tables are multilevel tables.

8. The method according to claim 6, wherein the block tables have exactly two levels.

9. The method according to claim 2, wherein the mapping tables are hash tables.

10. The method according to claim 2, further comprising using the hypervisor to establish a physical function for managing the storage controller.

11. The method according to claim 2, further comprising using the hypervisor to establish respective virtual functions for the virtual machines, and accessing the physical addresses for the virtual machines comprises invoking the respective virtual functions thereof.

12. The method according to claim 2, wherein accessing the physical addresses comprises:
   using the storage controller to execute a direct memory access and to generate an interrupt;
   handling the interrupt in the hypervisor by issuing a virtual interrupt; and
   handling the virtual interrupt in one of the virtual machines.

13. The method according to claim 1, wherein the I/O device is a graphics processing unit (GPU).

14. The method according to claim 1, wherein the I/O device is a network interface controller (NIC).

15. The method according to claim 1, wherein the I/O device comprises a physical entity that serves the central processing unit and has a software client executing therein.

16. The method according to claim 15, wherein the physical entity is an accelerator.

17. The method according to claim 1, wherein routing further comprises bypassing other managing entities.

18. The method according to claim 1, further comprising the step of: prior to receiving the disk access requests using the operating system to install and configure mapping tables, the mapping tables relating the virtual addresses to the physical addresses, wherein the step of translating is performed using the mapping tables.

* * * * *